(No Model.)
R. P. CURTIS.
PIPE THREADING MACHINE.
No. 497,002. Patented May 9, 1893.
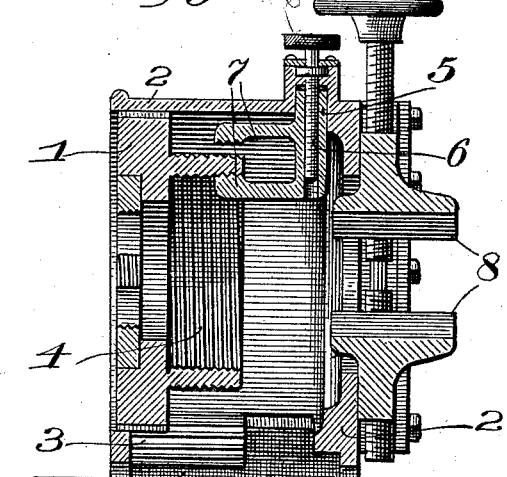
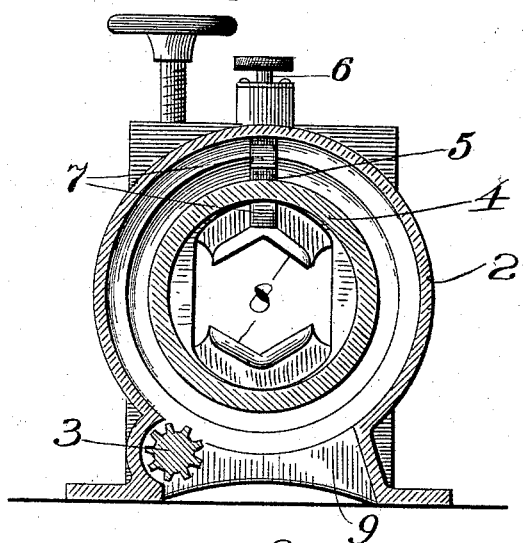
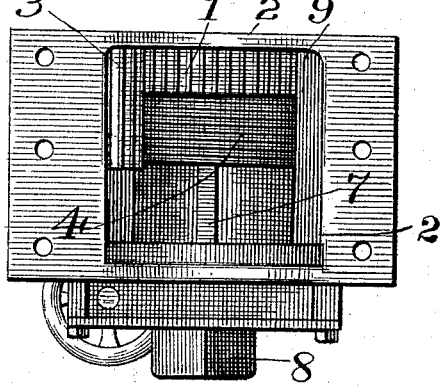
WITNESSES:
INVENTOR
R. P. Curtis
BY
ATTORNEY

UNITED STATES PATENT OFFICE.

RODERICK P. CURTIS, OF SOUTHPORT, ASSIGNOR TO CURTIS & CURTIS, OF BRIDGEPORT, CONNECTICUT.

PIPE-THREADING MACHINE.

SPECIFICATION forming part of Letters Patent No. 497,002, dated May 9, 1893.

Application filed April 8, 1892. Serial No. 428,376. (No model.)

*To all whom it may concern:*

Be it known that I, RODERICK P. CURTIS, a citizen of the United States, residing at Southport, in the county of Fairfield and State of Connecticut, have invented certain new and useful Improvements in Pipe-Threading Machines; and I do hereby declare the following to be a full, clear, and exact description of the invention, such as will enable others skilled in the art to which it appertains to make and use the same.

My invention relates to certain new and useful improvements in pipe threading machines, but has particular reference to means for discharging the chips as fast as they are cut by the threading dies, and also to the leading of the dies to the pipe.

In the accompanying drawings,—Figure 1 is a sectional elevation of a pipe threading machine embodying my improvement; Fig. 2, a cross-section of the same, and Fig. 3, a bottom view.

Similar numbers denote like parts in the several figures of the drawings.

My improvement is identified with that class of pipe threading machines in which a toothed die carrying ring revolves within and is supported by a casing, the teeth in the ring being engaged by a pinion journaled in the casing, to which pinion power is applied to revolve the ring.

1 is the toothed die carrying ring supported in the casing 2 and engaged by the pinion 3 journaled in said casing. Extending rearward from said ring is a lead screw 4 threaded exteriorly and interiorly, the exterior threads being greater in number to the inch than the interior threads or vice versa. 5 is a lead block engaged by a screw 6 which is secured to the casing 2 in such manner as to be stationary as to lengthwise movement.

7 are jaws which extend from said block one above the other, the inner faces of said jaws being threaded to correspond with the interior and exterior threads on the lead screw 4. These jaws straddle said lead screw and by operating the screw 6 said jaws are engaged with the interior or exterior threads on the lead screw, as the case may be. This double acting lead screw and lead block are very serviceable and advantageous in cutting threads on pipes or nipples since the machine is capable of cutting two threads each of a different pitch by simply throwing the lead block jaws into engagement with the interior and external threads on the lead screw. When it is desired to cut off a pipe the thread 6 is operated to bring the jaws equidistant from the lead screw without engaging the same so that the latter may revolve freely without longitudinal movement. The pipe is held by the usual vise jaws 8 at the rear of the casing.

Immediately below the pinion and the longitudinal field of travel of the die carrying ring the casing is cut away to form a gate, as seen at 9, in order that, as the chips are cut away they may drop down out of the casing and not clog the ring or pinion. This affords a very simple and effective way of getting rid of the chips, and cutting of such opening does not materially weaken the casing or take away support from the die carrying ring.

I claim—

1. In a pipe threading machine, the combination with the exteriorly and interiorly threaded lead screw of the lead nut having threaded jaws which straddle said screw, and means for operating said nut to throw said jaws alternately into engagement with the interior and exterior threads on said screw, substantially as set forth.

2. The combination of the lead screw having interior and exterior threads of different pitch, the lead block, the screw 6 engaging with said block and stationary as to lengthwise movement, and the jaws extending from said block within and without said ring, said jaws being threaded to correspond with the interior and exterior threads on the lead screw, substantially as and for the purposes set forth.

3. In a pipe threading machine, comprising a casing and a die carrying ring supported by and revolving within said casing, the hereindescribed means for discharging the chips cut by the dies consisting of a gate cut within the bottom of the casing and extending beneath the longitudinal field of travel of said ring, substantially as set forth.

In testimony whereof I affix my signature in presence of two witnesses.

RODERICK P. CURTIS.

Witnesses:
   J. S. FINCH,
   F. W. SMITH, Jr.